Jan. 7, 1930. F. C. ANDERSEN Re. 17,552
WINDOW AND DOOR FRAME
Original Filed Jan. 9, 1928 2 Sheets-Sheet 1
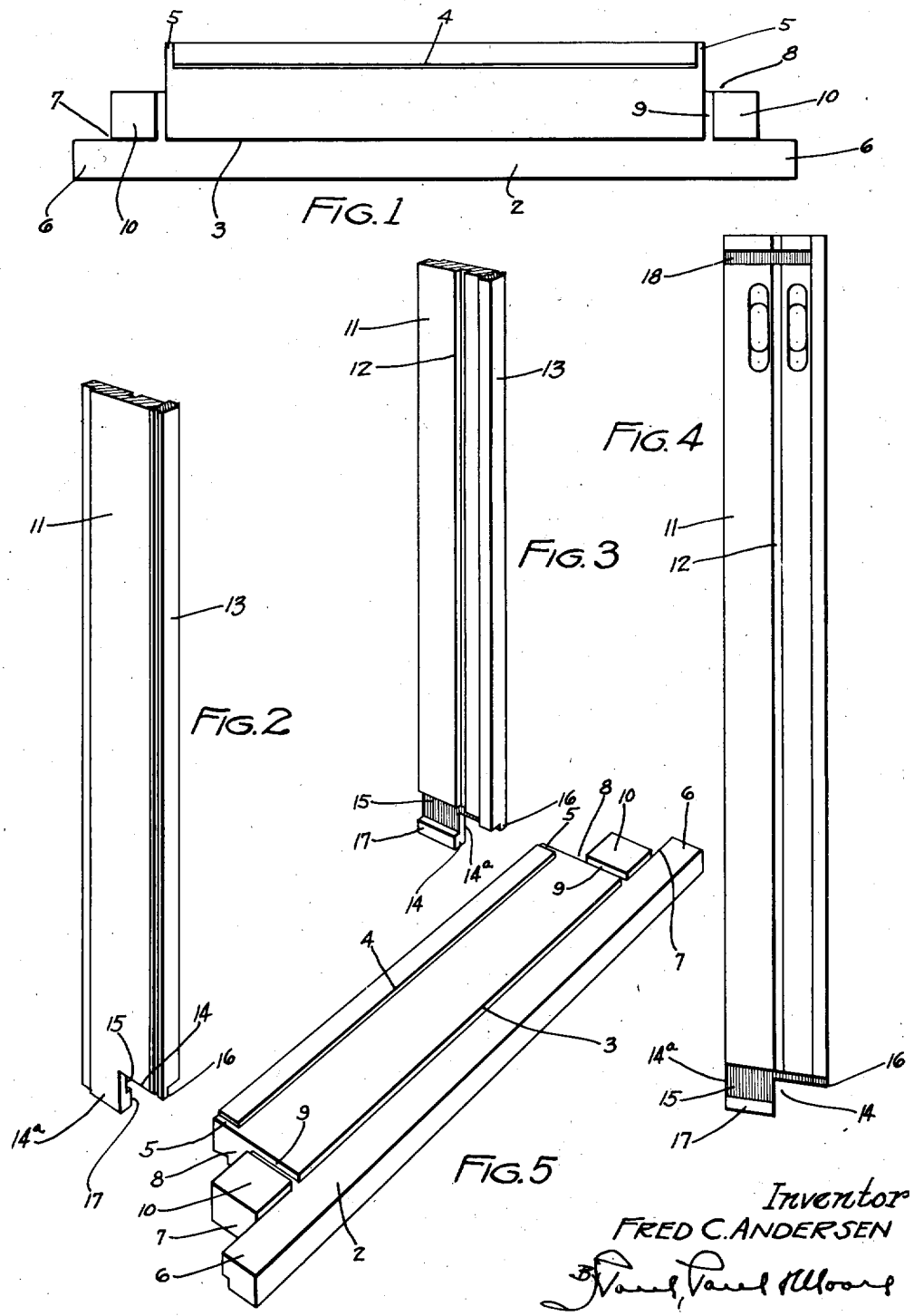
Inventor
FRED C. ANDERSEN
By Wood, Herron & Moore
ATTORNEYS Jan. 7, 1930. F. C. ANDERSEN Re. 17,552

WINDOW AND DOOR FRAME

Original Filed Jan. 9, 1928 2 Sheets-Sheet 2

Inventor
FRED C. ANDERSEN
By Paul, Paul & Albright
ATTORNEYS

Reissued Jan. 7, 1930

Re. 17,552

UNITED STATES PATENT OFFICE

FRED C. ANDERSEN, OF BAYPORT, MINNESOTA

WINDOW AND DOOR FRAME

Original No. 1,708,599, dated April 9, 1929, Serial No. 245,515, filed January 9, 1928. Application for reissue filed November 23, 1929. Serial No. 409,412.

In the operation of assembling the sill and jambs of a window or door frame, it is usually necessary for the carpenter to hold the jamb in position while securing it to the sill and often the work is delayed on that account.

The object of my invention is to provide a sill and jambs of such construction that they can be easily and quickly joined together and held in that position preliminary to the nailing operation.

A further object is to provide a means for interlocking the sill and the abutting ends of the jambs in such a way that the parts are firmly held in their proper relative position before nailing, and when secured together joints are formed which will thoroughly exclude air and moisture from the walls of the building.

A further object is to provide a means for interlocking the sill and jambs of a window or door frame, which, while adding materially to the ease of assembling the parts, and excluding the weather, will not increase to any appreciable extent the cost of manufacturing.

Other objects of the invention will appear from the following detailed description.

In the accompanying drawings forming part of this specification,

Figure 1 is a plan view of a sill constructed in accordance with my invention;

Figure 2 is a perspective view of one of the jambs and Figure 3 a similar view of the other jamb;

Figure 4 is an inside view of the jamb showing the construction at the end where it is fitted to the sill;

Figure 5 is a perspective view of the sill ready to receive the ends of the jambs;

Figure 6:
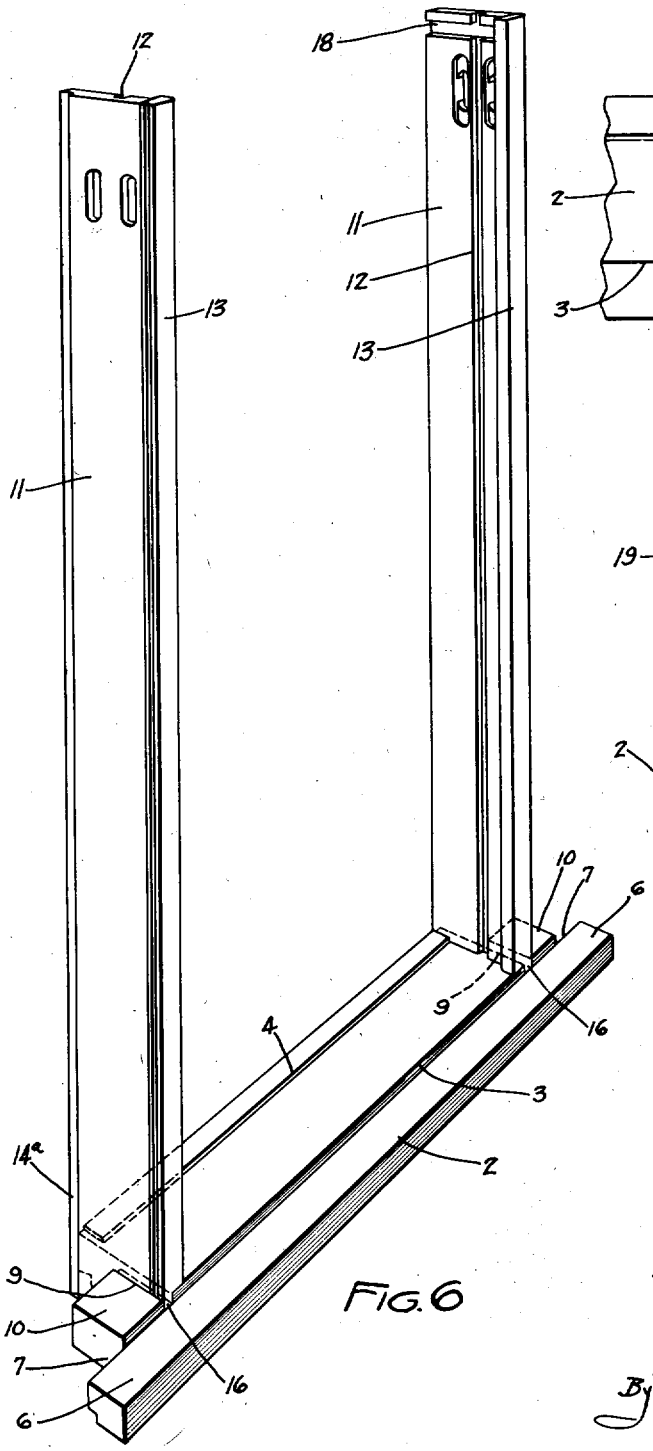
Figure 6 is a perspective view showing the sill and jambs assembled.

In the drawing, 2 represents a window sill having the usual shoulders 3 and 4, the gains 5 formed at the ends of shoulder 4 and the projecting ends or horns 6 forming continuations of the outer or forward portion of the sill. Adjacent these horns the sill is provided with the usual notches or mortises 7 and between these notches and the rear edge of the sill I provide similar notches 8. Across the ends of the sill intersecting the shoulder 3 and in alignment with the end walls of the notches 8, I provide dados 9, forming transverse grooves in the upper surface of the sill at each end, the cutting of these dados in the top surface of the sill providing rectangular areas 10 at each end of the sill forming block like surfaces whose inner edges are in alignment with the shoulder 3 and separated therefrom by the dados or grooves 9. These notches and grooves are all conveniently and rapidly formed by passing the sill through a suitable wood working machine that is adapted for work of this character.

The jamb of the frame which may be either a window or door frame, the invention being applicable to either, are indicated in the drawings by reference numerals 11, each jamb having on its inner face a vertical groove 12 to receive a parting bead and provided on one edge with a narrow blind stop 13, having a suitable joint connection with the adjacent edge of the jamb. The lower end of each jamb has a notch 14 formed therein, extending approximately to a point near the vertical center of the jamb and between the notch 14 and the rear edge of the jamb a depending tongue $14^a$ is provided. The inner face of the jamb at the lower end is provided with a transverse recess or dado 15 which extends entirely across the tongue $14^a$ intersecting the horizontal edge of the mortise 14 and forming at that point a transverse tongue 16 that is adapted to enter the dado 9 at the ends of the sill. The rear portion of the dado, or the portion thereof that is formed in the rear section of the jamb, is adapted to receive the end of the sill that is in alignment with the dado 9. The vertical edge of the notch or mortise 14 butting against the wall of the notch 8 that is at right angles to the dado 9 forms a stop for the jamb when it has been seated properly on the end of the sill. The dado 15 as shown plainly in Figure 4, is diagonally arranged in the surface of the jamb so that it will fit the outward and downward inclination of the sill and allow the jambs to stand vertically with respect to the sill. Below each dado 15 is a rib or shoulder 17 forming the lower wall of the rear portion of the dado and this shoulder will bear against the under surface of the sill at the end thereof and aid in guiding the jamb to its seat in the sill.

It is evident that when the notches or mortises and dados have been properly formed in the ends of the sill and the adjacent ends of the jambs and the parts assembled, they will stand in proper relation to one another without being held or otherwise supported and if the notches and dados are cut truly and of proper size, the jambs will be held firmly in vertical relation to the sill and be ready to be permanently secured to the sill by nails or other means, and during such operation it will not be necessary for the carpenter or other person to support the sill or the jambs. Furthermore, when the jambs and sills are assembled in the manner specified, the joint between them will be so tortuous that it will be practically impossible for air or moisture to enter the building walls between the ends of the sill and the jambs and this improvement in the construction of the window or door frame may be accomplished with substantially the same amount of labor and machine work that is now necessary to produce a sill and jamb of the ordinary description.

Figure 4 of the drawing illustrates the appearance of the inner face of the jamb when ready to receive the sill, a transverse notch or dado 18 being provided at the upper end of the jambs to receive the ends of the head jamb.

In Figure 6 the sill and jambs are shown in their assembled relation with the tight fitting joints indicated between the lower ends of the jamb and the sill.

Figure 7:
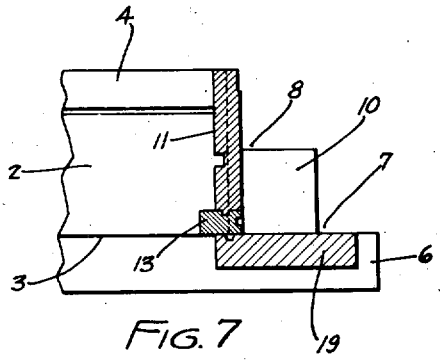
Figure 7 is a horizontal sectional view through one side of a slightly modified form of frame showing a tongue and groove weather-proof joint between the blind stop and casing.

In Figure 7 a cross section of the jamb is shown illustrating its position with respect to the outside finish or casing 19 which, as shown, has one edge overlapping the blind stop and concealing a portion of it.

Figure 8:
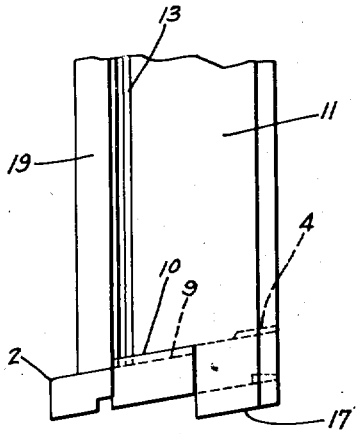
Figure 8 is an edge view of the frame looking toward the end of the sill.

In Figure 8 the edge view illustrates the appearance of the assembled sill and jamb, the dados and grooves being indicated by dotted lines.

Figure 9:
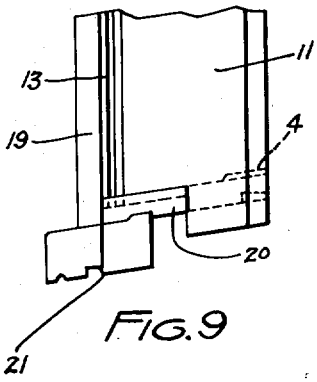
Figure 9 shows a slightly modified form of sill composed of upper and lower sections, the view looking toward one side of the frame and the end of the sill.

In Figure 9, a modification is shown in the form of the sill, consisting as shown, of an upper comparatively shallow section 20 and a lower thicker forward section 21. These parts are notched and grooved in substantially the same manner as described with reference to the previous figures and when assembled, the jambs are firmly held with respect to the sill and may be conveniently and permanently secured thereto by nails or other means.

In this case I claim a novel method of forming and assembling the sill and jambs. This method consists in first notching the rear edge of the sill at each end and providing a groove in the upper surface of the sill extending transversely thereof and forming substantially a continuation of the transverse face of each notch. I then notch the lower end of each jamb at the forward edge thereof so that depending tongues are formed on the rear portion of each jamb extending substantially from the rear edge to the middle portion of the jamb. The inner face of each tongue is grooved or recessed to receive the end of the sill, this groove being carried across the inner face of the transverse edge of the notch in each jamb. This adapts the edge of the notch to enter the transverse groove in the upper surface of the sill while the tongue is firmly seated in the notch in the rear edge of the sill and by forming the gains at the ends of the rear shoulder on the sill, I provide a seat for the shoulder at the upper edge of the transverse groove which aids in holding the jamb and sill in their proper relative position.

This manner or method of forming and assembling the sill and jambs insures a weather proof joint between the sill and the lower ends of the jambs and the carpenter having assembled the sill and jambs in this way and without bracing or holding them, may nail or otherwise secure the interlocking joints together and thereby form a permanent connection between them.

This invention may be used in a window frame of the mullion type or in a triple or quadruple frame in which case the sill will be provided with transverse notches intermediate the ends in addition to the notch at each end of the sill.

I claim as my invention:

1. A sill having notches formed in and extending from the rear edge of the sill forwardly thereof, and jambs having tongues formed on their lower ends to enter said notches, said tongues extending only partially across said jambs, the inner faces of said tongues being grooved to receive the abutting portions of the sill and vertical edges of the tongues being seated against abutting walls of said notches.

2. A sill having notches formed at the rear edge of the sill and extending transversely therein, jambs having notches formed in the forward portion of their lower ends, said notches extending transversely of the jambs to points near the vertical centers thereof, tongues being formed between said notches and the rear edges of the jambs to enter the notches of said sill, the inner faces of said tongues having means for interlocking with the abutting walls of the sills.

3. A sill having notches formed at the rear edge of the sill and extending transversely therein, jambs having notches formed in the forward portion of their lower ends, said notches extending transversely of the jambs to points near the vertical centers thereof, tongues being formed between said notches and the rear edges of the jambs to enter the notches of said sill, the inner faces of said tonues having means for interlocking with the abutting ends of the sills, and the transverse edges of the notches in said jambs having means for interlocking with the upper portion of said sill forward of the notches therein.

4. A sill having a notch formed at each end in the rear edge thereof, extending transversely of the sill, the middle portion of the sill having grooves formed transversely thereof with one wall of the grooves in alignment with a wall of said notches, jambs having notches formed in the lower ends thereof and tongues to enter the notches of said sill, the transverse wall of the notches in said jambs being grooved to interlock with the grooves in the upper surface of said sill.

5. A sill having a notch formed at each end in the rear edge thereof, extending transversely of the sill, the middle portion of the sill having grooves formed transversely thereof with one wall of the grooves in alignment with a wall of said notches, jambs having notches formed in the lower ends thereof and tongues to enter the notches of said sill, the inner faces of said tongues and the transverse wall of the notches in said jambs being grooved to interlock with the ends of said sill and the grooves in the upper surface of said sill.

6. A window sill having shoulders longitudinally formed thereon at the rear edge of the sill and near the forward edge thereof, said sill having notches formed in its rear edge at each end and gains formed in the ends of the rear shoulder, said sill also having grooves formed in its upper surface extending transversely through said forward shoulder and in alignment with the transverse faces of said notches, jambs having notches formed in their lower forward edges and tongues to enter the notches in said sill, the transverse inner edge of the notch in each jamb and the inner face of the tongue thereon being grooved to allow the transverse edge of the jamb notch to enter the groove in the upper surface of the sill and the end of the sill to interlock with the abutting face of the tongue, the upper wall of the groove in said jamb being seated in said gain and on the upper surface of the sill.

7. A sill having a notch formed in its rear edge at each end and extending forwardly transversely of the sill, the upper surface of the sill in advance of said notches having transverse guides, jambs having notches formed on their forward edges at the lower ends of the jambs and depending tongues formed at the rear edges of the jambs, the transverse edges of the notches in said jambs engaging the guides in the upper surface of the sill and the tongues of said jambs entering the notches of said sill and being seated against the transverse walls thereof when the sill and jambs are assembled.

8. A sill and jambs therefor, the sill having notches and surface guides and the jambs having notches and tongues to cooperate with the notches and guides of said sill for locking the sill and jambs together.

9. A window or door side jamb having a notch in its lower end extending inwardly from one edge, a depending tongue being formed between said notch and the other edge of the jamb, the inner face of said tongue having a transverse groove therein and a sill having a portion to enter said groove and a surface whereon the horizontal wall of the notch in said jamb is seated.

10. A sill having notches formed in its edge at each end and extending transversely thereof, the upper surface of the sill adjacent said notches having transverse seats thereon, jambs having notches formed in one edge at the lower ends of the jamb and depending tongues between said notches and the other edge of the jambs, the transverse edges of the notches in said jambs engaging the seats in the upper surface of the sill and the tongues of said jambs entering the notches of said sill and being seated against the transverse walls thereof when the sill and jambs are assembled.

11. A sill having a notched end and a transverse groove or dado adapted to conduct moisture outwardly on the sill, and a jamb having a depending part to enter said notched end and a tongue to slide in said groove transversely of the sill.

12. A sill having a notch formed in the end thereof and a transverse groove or dado in its surface adjacent said notch, a jamb having a transverse recess in its face to receive the end wall of said sill and also provided with a tongue to enter said groove.

13. A sill having a notch formed in the end thereof and a transverse groove in its surface adjacent said notch, a jamb having a transverse recess in its face to receive said sill and also provided with a tongue to enter said groove, the recess of said jamb having a lower wall to engage the under surface of the sill and cooperate with said groove and tongue to hold the jamb upright.

14. A window or door jamb having a transverse recess formed in its inner face adjacent its lower end, and also provided with a transverse tongue, a sill having a transverse groove in its upper surface to receive said transverse tongue, the end wall of said sill being adapted to enter the recess of said jamb with the lower wall of the recess engaging the under surface of said sill and cooperating with said transverse tongue and groove to hold the jamb in place.

15. A sill having a groove formed in its upper surface adjacent the end and a jamb having a transverse recess in its inner face to receive the end of said sill and also provided with a transverse tongue to enter said groove.

16. A sill having a transverse groove or dado and a vertical end surface, a jamb having a portion adapted to extend down over said end surface for nailing thereto, and also provided with means to enter said groove and form a close joint therewith.

17. A sill having a transverse groove in its surface, and a jamb having means to enter said groove, and a part to bear on the under surface of the sill and cooperate with said groove and said means to hold the jamb in place.

18. A sill, and a jamb adapted to be seated against a surface thereof, said jamb having means cooperating with said sill to form a close joint with the upper surface thereof, and also provided with means between which and said joint the sill may be held.

In witness whereof, I have hereunto set my hand this 15th day of November, 1929.

FRED C. ANDERSEN.